B. F. Sanborn,
Cutting Leather.
Nº 57,976. Patented Sep. 11, 1866.
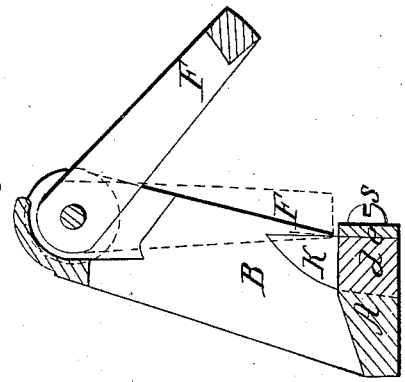
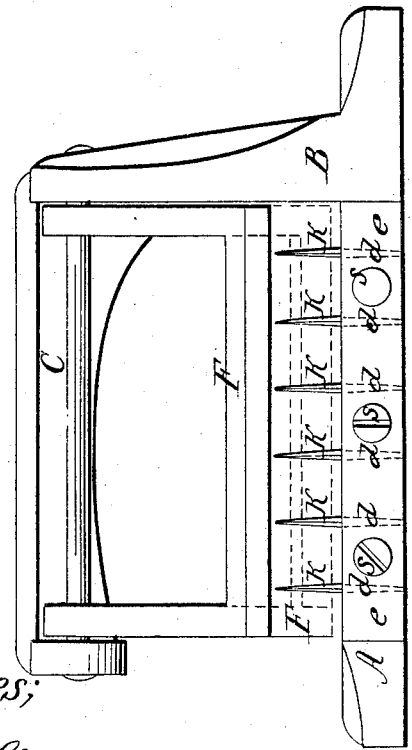
Witnesses:
Inventor:
B. F. Sanborn

UNITED STATES PATENT OFFICE.

BENJAMIN F. SANBORN, OF BOSTON, MASSACHUSETTS.

IMPROVED MACHINE FOR CUTTING BELT-LACING.

Specification forming part of Letters Patent No. 57,976, dated September 11, 1866.

*To all whom it may concern:*

Be it known that I, BENJAMIN F. SANBORN, of Boston, in the county of Suffolk and State of Massachusetts, have invented a new and useful Machine for Cutting Belt-Lacing; and I do hereby declare that the following full, clear, and exact description of the construction and operation of the same, reference being had to the accompanying drawings, forming a part of this specification, is sufficient to enable others skilled in the art to make and use my improvement without other invention or discovery.

Figure 1 is a front elevation. Fig. 2 is a side elevation.

Belt-laces are cut out the straight way of the leather, must be even and true, and if cut by a knife and straight-edge, as usual, the operation is tedious; but by my machine perfect evenness is secured and great rapidity of work.

I make a casting to consist of a bed-plate, A, a standard, B, and a horizontal arm, C. I make in the bed-plate slots $d$ for the reception of knives K, at proper distances apart, and fasten a securing-plate, $e$, to clamp the knives K in place to the bed-plate A by screws $s$.

A swinging pressure-bar, F, is suspended from the horizontal arm C by appropriate means.

A piece of leather to be cut into belt-laces is first cut to a straight edge on one side, and is then drawn under the pressure-bar against the knives, the straight edge next the standard, which acts as a gage for the nearest knife, and each knife as the gage for the next one out from the standard, thus insuring perfect uniformity of the lacings cut with very little trouble.

The knives should have their edges inclined forward or back to enable them to make a draw-cut.

What I claim as my invention, and desire to secure by Letters Patent, is—

The arrangement of bed-plate A, pressure-bar F, and standard B, in combination with the vertical knives with inclined edges K, substantially as described.

B. F. SANBORN.

Witnesses:
THOS. WM. CLARKE,
H. FLOYD FRANKLIN.